United States Patent
Mital et al.

(10) Patent No.: US 9,850,797 B2
(45) Date of Patent: Dec. 26, 2017

(54) SELECTIVE CATALYTIC REDUCTION DEVICE

(71) Applicant: GM GLOBAL TECHNOLOGY OPERATIONS LLC, Detroit, MI (US)

(72) Inventors: Rahul Mital, Rochester Hills, MI (US); Jianwen Li, West Bloomfield, MI (US); Steven J. Schmieg, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 409 days.

(21) Appl. No.: 14/619,146

(22) Filed: Feb. 11, 2015

(65) Prior Publication Data
US 2016/0230631 A1   Aug. 11, 2016

(51) Int. Cl.
*F01N 3/20* (2006.01)
*B01D 53/94* (2006.01)
*F01N 13/00* (2010.01)

(52) U.S. Cl.
CPC ......... *F01N 3/2066* (2013.01); *F01N 13/009* (2014.06); *F01N 13/0093* (2014.06); *F01N 13/0097* (2014.06); *F01N 2610/02* (2013.01); *F01N 2900/1622* (2013.01); *Y02T 10/24* (2013.01)

(58) Field of Classification Search
None
See application file for complete search history.

(56) References Cited

U.S. PATENT DOCUMENTS

| | | | | |
|---|---|---|---|---|
| 9,737,852 | B2* | 8/2017 | Massner | B01D 53/94 |
| 2009/0196812 | A1* | 8/2009 | Bull | B01D 53/9418 423/239.1 |
| 2010/0310440 | A1* | 12/2010 | Bull | B01J 20/186 423/239.1 |
| 2010/0319324 | A1* | 12/2010 | Mital | F01N 3/021 60/286 |
| 2011/0271660 | A1* | 11/2011 | Gonze | F01N 3/027 60/286 |

FOREIGN PATENT DOCUMENTS

WO   WO 2013139414 A1 *  9/2013  ......... B01J 35/0006

* cited by examiner

*Primary Examiner* — Walter D Griffin
*Assistant Examiner* — Jelitza Perez
(74) *Attorney, Agent, or Firm* — Quinn IP Law

(57) ABSTRACT

A SCR device includes a substrate having a first portion, and a second portion disposed downstream of the first portion. The first portion of the substrate includes a volume that is between 15% and 25% of a total volume of the substrate. A first selective catalytic reduction compound is disposed on the first portion of the substrate, and includes an iron zeolite (Fe-Zeolite) compound. A second selective catalytic reduction compound is disposed on the second portion of the substrate, and includes a copper (Cu) SAPO-34 compound. The copper SAPO-34 compound includes a catalyst density of less than 2.74 mg copper per cubic centimeter of copper SAPO-34 compound. The copper SAPO-34 compound is applied onto the second portion of the substrate at a compound density of less than 110 g of copper SAPO-34 compound per liter of volume of the second portion of the substrate.

17 Claims, 2 Drawing Sheets

SELECTIVE CATALYTIC REDUCTION DEVICE

TECHNICAL FIELD

The disclosure generally relates to a selective catalytic reduction device for an exhaust gas treatment system of a vehicle.

BACKGROUND

Vehicular exhaust gas treatment systems are used to treat the exhaust gas from an engine of the vehicle. The exhaust gas emitted from a diesel engine, is a heterogeneous mixture that contains gaseous emissions such as carbon monoxide ("CO"), unburned hydrocarbons ("HC") and oxides of nitrogen ("$NO_X$") as well as condensed phase materials (liquids and solids) that constitute particulate matter. Catalyst compounds, typically disposed on catalyst supports or substrates that are disposed within the exhaust gas treatment system, are provided to convert certain or all of these exhaust gas constituents into non-regulated exhaust gas components. For example, diesel exhaust gas treatment systems may include one or more of a precious metal containing diesel oxidation catalyst ("DOC") converter for the reduction of CO and excess HC, a selective catalytic reduction ("SCR") device for the reduction of $NO_X$ with the assistance of a diesel exhaust fluid ("DEF"), and a diesel particulate filter ("DPF") device for the removal of particulate matter.

The SCR operation for the reduction of $NO_X$ described above generates dinitrogen oxide ($N_2O$). It is preferable to design the exhaust gas treatment system in such a way as to minimize $N_2O$ output from the SCR device.

SUMMARY

A catalytic device for an exhaust gas treatment system of a vehicle is provided. The catalytic device includes a canister defining an interior. The canister includes an inlet and an outlet. The canister is configured to receive a flow of exhaust gas through the inlet, and discharge the flow of exhaust gas through the outlet. A substrate is supported by the canister, and is disposed within the interior of the canister. The substrate includes a porous structure that is operable to allow the flow of exhaust gas to flow through the interior of the canister, from the inlet to the outlet. The substrate includes a first portion and a second portion. The second portion is disposed downstream of the first portion. A first selective catalytic reduction compound is disposed on the first portion of the substrate, and a second selective catalytic reduction compound is disposed on the second portion of the substrate. The first selective catalytic reduction compound includes an iron based catalyst. The second selective catalytic reduction compound includes a non-iron based catalyst.

Accordingly, because iron based catalysts produce lower levels of $N_2O$, particularly at temperatures below 350° C., and because most of the $N_2O$ produced by the catalytic device is formed in the initial axial length of the catalytic device, i.e., near the upstream end of the catalytic device, the iron based catalyst of the first selective catalytic reduction compound, positioned at the upstream end of the catalytic device, reduces the total amount of $N_2O$ production. Additionally, higher non-iron catalyst loading increases sintering, which also increases $N_2O$ production. Accordingly, by limiting the catalyst loading, i.e., density, of the second selective catalytic reduction compound, the production of $N_2O$ may further be reduced.

The above features and advantages and other features and advantages of the present teachings are readily apparent from the following detailed description of the best modes for carrying out the teachings when taken in connection with the accompanying drawings.

DETAILED DESCRIPTION

Figure 1:
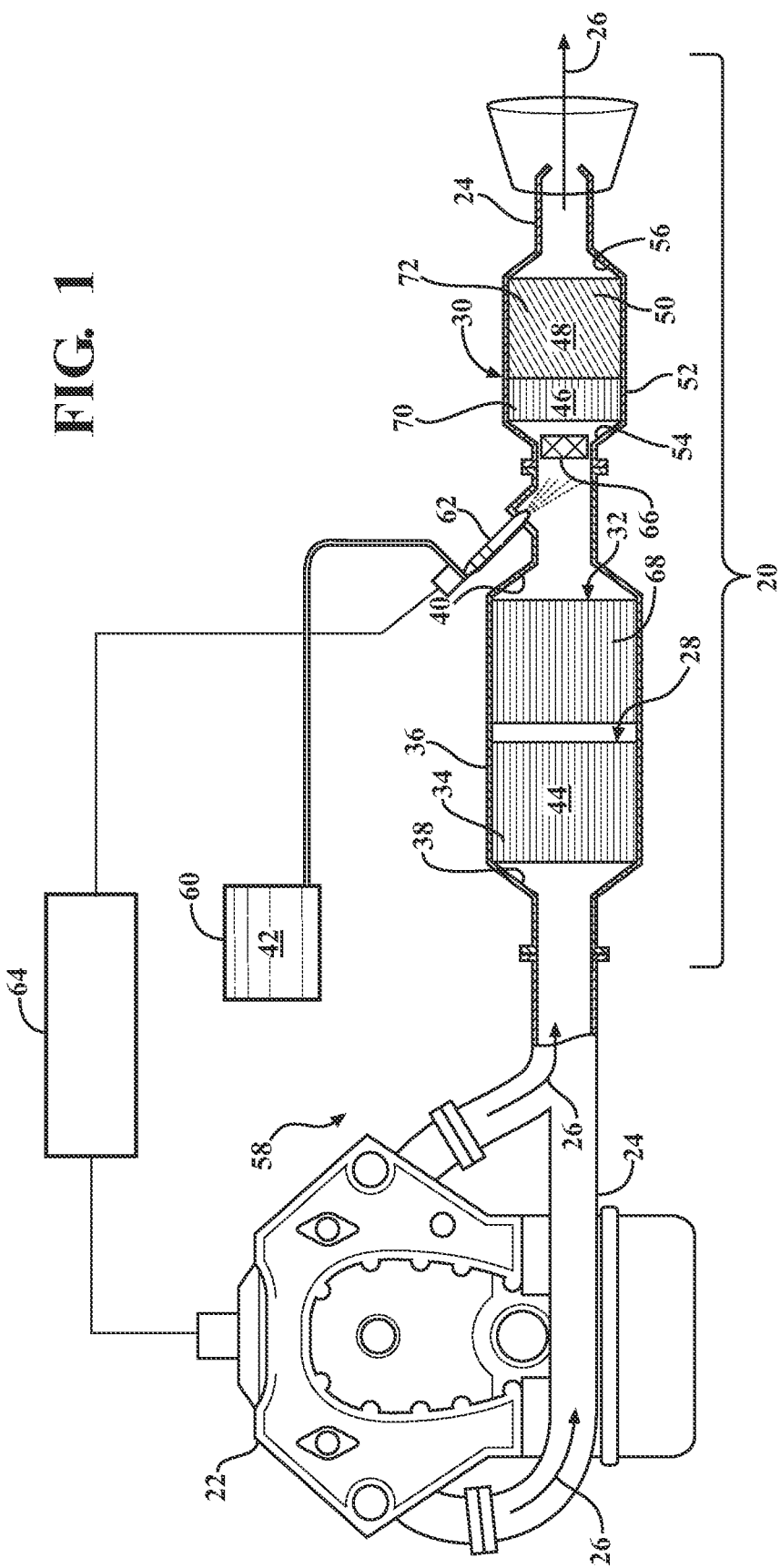
FIG. 1 is a schematic diagram of an exhaust gas treatment system for an engine.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, an exemplary embodiment of an exhaust gas treatment system is generally shown at 20. The exhaust gas treatment system 20 shown in FIG. 1 treats the regulated exhaust gas constituents of a diesel engine 22. While the exemplary embodiment of the exhaust gas treatment system 20 is shown and described herein for a diesel engine 22, it should be appreciated that the teachings of the disclosure may be applied to other types of engines, and that the exhaust gas treatment system 20 may be configured other than shown and described herein.

The exhaust gas treatment system 20 includes an exhaust gas conduit 24, which may comprise several segments that function to transport exhaust gas, generally indicated by arrows 26, from the diesel engine 22 to and between various exhaust treatment devices of the exhaust gas treatment system 20. The exhaust treatment devices of the exemplary embodiment shown in FIG. 1 include, but are not limited to, a Diesel Oxidation Catalyst (DOC) converter 28, a Selective Catalyst Reduction (SCR) device 30, and a Diesel Particulate Filter (DPF) device 32.

As shown in the exemplary embodiment of FIG. 1, the DOC converter 28 is disposed upstream of the SCR device 30 in the exhaust gas conduit 24. The DOC converter 28 includes a flow-through substrate 34 that is packaged in a rigid canister 36, between an inlet 38 and an outlet 40 of the DOC converter 28. The inlet 38 and the outlet 40 of the DOC converter 28 are in fluid communication with exhaust gas conduit 24, and facilitate the flow of exhaust gas through the DOC converter 28. The DOC converter 28 includes an oxidation catalyst compound 44 disposed on the substrate 34 of the DOC converter 28. The oxidation catalyst compound 44 of the DOC converter 28 may include platinum (Pt), palladium (Pd), base metals (Ce, Cu, Mo, Fe, Mn, La etc.), or any combination of platinum, palladium, and base metals. The DOC converter 28 treats unburned gaseous and non-volatile hydrocarbons and carbon monoxide that are emitted from the engine 22 as part of the exhaust gas, or are intentionally injected into the exhaust gas via an in-cylinder post fuel injection process or an in-exhaust hydrocarbon injection process.

The DPF device 32 operates to filter carbon and other particulate matter from the flow of the exhaust gas. The DPF device 32 may be constructed using a filter substrate 68. As shown in exemplary embodiment of FIG. 1, the filter substrate 68 is packaged in the rigid canister 36 of the DOC converter 28. The filtered particulate matter is deposited on the filter substrate 68. The DPF device 32 is regenerated periodically to burn off the accumulated particulate matter. Regeneration of the DPF device 32 is typically automatic and is controlled by the vehicle controller 64 based on signals generated by engine 22 and exhaust system sensors. The regeneration event involves increasing the temperature of the filter substrate 68, typically by the exothermic reaction occurring on the DOC converter 28, to levels that are often above 600° C., in order to burn the accumulated particulate matter.

As shown in the exemplary embodiment of FIG. 1, the SCR device 30 is disposed downstream of the DOC converter 28 and the DPF device 32. The SCR device 30 includes a flow-through substrate 50 that is packaged in a rigid canister 52 between an inlet 54 and an outlet 56 of the SCR device 30. The inlet 54 and the outlet 56 of the SCR device 30 are in fluid communication with exhaust gas conduit 24, and facilitate the flow of exhaust gas through the SCR device 30.

The SCR device 30 converts nitrogen oxides, also referred to as NOx, with the aid of a catalyst, into diatomic nitrogen ($N_2$) and water ($H_2O$). A reductant, typically anhydrous ammonia, aqueous ammonia, or urea, is added to the flow of exhaust gas and is absorbed onto the catalyst disposed on the substrate 50 of the SCR device 30. The reductant is hereinafter referred to as Diesel Emission Fluid (DEF) 42.

The DEF 42 may be supplied by a dosing system 58. The dosing system 58 may include a reductant supply tank 60 that is in fluid communication with a reductant injector 62. As shown in the exemplary embodiment of FIG. 1, the reductant injector 62 is in fluid communication with the exhaust gas conduit 24, and is disposed upstream of the SCR device 30 in the exhaust gas conduit 24, and downstream of the DOC converter 28. The dosing system 58 is operable to inject the DEF 42, via the reductant injector 62, into the flow of exhaust gas upstream of the SCR device 30. The DEF 42 may be in the form of a gas, a liquid or an aqueous urea solution. The DEF 42 may be mixed with air in the reductant injector 62 to aid in the dispersion of the injected spray. A controller 64, such as a powertrain or a vehicle controller 64, controls the injection of the DEF 42 into the exhaust gas conduit 24.

A mixer 66 may be disposed in the exhaust gas conduit 24 downstream of the reductant injector 62, and upstream of the SCR device 30. The mixer 66 is operable to mix the DEF 42 injected into the exhaust gas conduit 24 with the flow of exhaust gas.

Dinitrogen Oxide ($N_2O$) emissions from the exhaust gas treatment system 20 are primarily a byproduct of the reaction that occurs in the SCR device 30. The nitrogen containing oxidants ($NO$, $NO_2$, $HNO_3$) and nitrogen containing reductant ($NH_3$) generate surface intermediates that cause $N_2O$ formation. The SCR device 30 described below is designed to minimize $N_2O$ formation in the SCR device 30.

At temperatures below 350° C., $N_2O$ forms mainly due to formation and decompound of ammonium nitrate-like intermediate species. Copper (Cu) based SCR catalysts are generally more active in ammonium nitrate formation than are vanadium (V) based and iron (Fe) based SCR catalysts. As such, higher amounts of $N_2O$ formation occurs in copper based SCR catalysts than does in vanadium based and iron based SCR catalysts. Since $N_2O$ forms as an undesired byproduct of the $NO_X$ reduction in the SCR device 30, it stands to reason that most of the $N_2O$ forms in the initial axial length of the SCR catalyst, i.e., at the upstream end of the SCR device 30, where most of the $NO_X$ reduction occurs. $N_2O$ formation at temperatures above 350° C. is generally due to ammonia ($NH_3$) oxidation. At elevated temperatures, when stored ammonia desorbs, part of the ammonia oxidizes to form $N_2O$. As such, higher ammonia storage capacity in the SCR catalyst also leads to higher $N_2O$ formation. Additionally, the selectivity to $N_2O$ formation increases with aging of the SCR catalyst. For catalysts such as a copper zeolite, higher amounts of copper species, and higher washcoat loading, leads to sintering, which results in higher $N_2O$ formation. The SCR device 30 described below is configured to address the leading causes of $N_2O$ formation, and thereby reduce $N_2O$ emissions from the exhaust gas treatment system 20.

Figure 2:
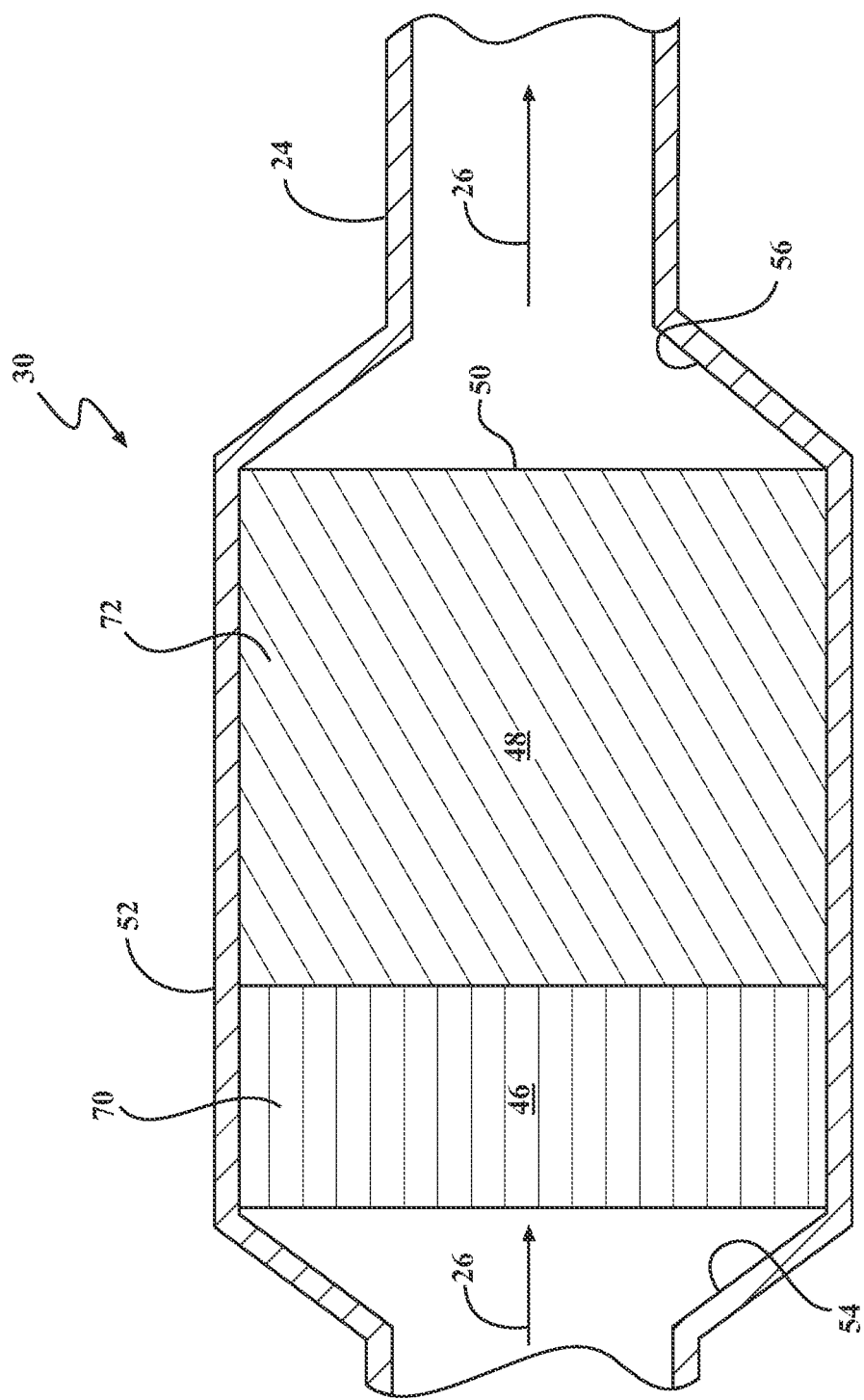
FIG. 2 is a schematic cross sectional view of a selective catalytic reduction device of the exhaust gas treatment system.

Referring to FIG. 2, the SCR device 30 is shown at 30. As noted above, the SCR device 30 includes the rigid canister 52, which defines an interior. The canister of the SCR device 30 includes the inlet 54 and the outlet 56. The canister receives the flow of exhaust gas 26 through the inlet 54, and discharges the flow of exhaust gas through the outlet 56. The substrate 50 is supported by the canister, and is disposed within the interior of the canister. The substrate 50 includes a porous, e.g., honeycomb, structure that is operable to allow exhaust gas to flow through the interior of the canister, from the inlet 54 to the outlet 56.

The substrate 50 of the SCR device 30 includes a first portion 70 and a second portion 72. The second portion 72 is disposed downstream of the first portion 70. The first portion 70 is generally disposed adjacent the inlet 54 of the rigid canister 52, and the second portion 72 is generally disposed adjacent the outlet 56 of the rigid canister 52. As such, the majority of the $NO_X$ reduction, and thereby the majority of the $N_2O$ formation, occurs in the first portion 70 of the substrate 50.

The first portion 70 of the substrate 50 defines a first volume, and the second portion 72 of the substrate 50 defines a second volume. The sum of the first volume and the second volume equals a total volume of the substrate 50. The substrate 50 may include an approximate cell density of between 300 cells per square inch and 400 cells per square inch. Preferably, the substrate 50 includes a wall thickness between the range of 3 microns and 5 microns. Preferably, the substrate 50 includes a cell structure that includes 300 cells per inch, with a wall thickness of approximately 5 microns (often notated as a 300/5 cell structure) or a cell structure that includes 400 cells per inch, with a wall thickness of approximately 4 microns. The substrate 50 is a single, unitary construction having the same cell structure in both the first portion 70 and the second portion 72.

The first volume of the first portion 70 of the substrate 50 is between 15% and 25% of the total volume of the substrate 50. The second volume of the second portion 72 of the substrate 50 is between 75% and 85% of the total volume of the substrate 50.

The substrate 50 is zone coated, with the first selective catalytic reduction compound 46 is disposed on the first portion 70 of the substrate 50, i.e., a first zone, and the second selective catalytic reduction compound 48 disposed on the second portion 72 of the substrate 50, i.e., a second zone. The first selective catalytic reduction compound 46 includes an iron based catalyst. Preferably, the first selective catalytic reduction compound 46 includes an iron zeolite (Fe-Zeolite) compound. As noted above, iron based SCR catalysts produce less $N_2O$ than copper based SCR catalysts. Additionally, as noted above, a majority of the $NO_X$ reduction, and thereby the $N_2O$ formation, occurs at the upstream end of the SCR device 30. Accordingly, by using the iron zeolite compound as the catalyst on the first portion 70 of the SCR device 30, the amount of $N_2O$ formation is reduced.

The second selective catalytic reduction compound 48 includes a non-iron based catalyst. Preferably, the second selective catalytic reduction compound 48 includes a copper based catalyst. More preferably, the second catalytic reduction compound includes a copper (Cu) SAPO-34 compound. As is known to those skilled in the art, Cu-SAPO-34 is a particular type of a copper based zeolite catalyst. The copper based zeolite catalyst has better overall NOx reduction capability at higher and lower temperatures, and is less sensitive to $NO_2$, then are iron based catalysts. Lower $NO_2$ production upstream of the second selective catalytic reduction compound 48, from the first selective catalytic reduction compound 46, will result in lower $N_2O$ production without negatively impacting the NOx reduction. A complete iron zeolite catalyst would require high $NO_2$ fraction for efficient NOx reduction compared to a copper zeolite.

The copper SAPO-34 compound includes a catalyst density of less than 2.74 mg copper per cubic centimeter of copper SAPO-34 compound (45 mg of copper per cubic inch of Cu SAPO-34 compound), and greater than 15 mg copper per cubic inch of copper SAPO-34 compound. The catalyst density is defined herein as the mass of catalyst material per unit volume of catalyst compound. The copper SAPO-34 compound is applied onto the second portion 72 of the substrate 50 at a compound density of less than 110 g washcoat loading per liter of the second volume of the second portion 72 of the substrate 50, and is applied onto the second portion 72 of the substrate 50 at a compound density of greater than 55 g washcoat loading per liter of the second volume of the second portion 72 of the substrate 50. The compound density is defined herein as the mass of catalyst compound per unit volume of the substrate 50. The washcoat loading is defined herein as the carrier for a precious metal catalyst, and generally includes a slurry layer that is applied to a substrate, and which is dried and calcined. The copper SAPO-34 compound includes the desired catalyst density and is applied onto the second substrate 50 at the desired compound density to reduce the sintering of the copper SAPO-34 compound that occurs with age, and optimize the NH3 storage capacity for $NO_X$ oxidation, while minimizing the production of $N_2O$.

By using the iron-zeolite catalyst on the first portion 70 of the substrate 50, and by limiting the amount of copper in the copper SAPO-34 compound to less than 2.74 mg copper per cubic centimeter of copper SAPO-34 compound, and limiting the application of the copper SAPO-34 compound onto the second portion 72 of the substrate 50 to less than 110 g washcoat loading per liter of the second volume of the second portion 72 of the substrate 50, the SCR device 30 provides an ammonia (NH3) storage capacity between 0.8 g and 1.2 g of ammonia per liter of volume of the substrate 50 at two hundred degrees Celsius (200° C.). This level of ammonia storage is sufficient for $NO_X$ reduction, while minimizing the $N_2O$ formation. Additionally, the ammonia storage capacity of the SCR device 30 described above decreases at a rate of less than 4 mg per each 1° C. increase in temperature, which limits the desorption of ammonia to minimize $N_2O$ formation.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A catalytic device for an exhaust gas treatment system of a vehicle, the catalytic device comprising:
a canister defining an interior, and having an inlet and an outlet, wherein the canister is configured to receive a flow of exhaust gas through the inlet, and discharge the flow of exhaust gas through the outlet;
a substrate supported by the canister and disposed within the interior of the canister, wherein the substrate includes a porous structure that is operable to allow the flow of exhaust gas to flow through the interior of the canister, from the inlet to the outlet;
wherein the substrate includes a first portion, and a second portion disposed downstream of the first portion;
wherein the first portion of the substrate defines between 15% and 25% of a total volume of the substrate, and wherein the second portion of the substrate defines between 75% and 85% of the total volume of the substrate;
a first selective catalytic reduction compound disposed on the first portion of the substrate;
a second selective catalytic reduction compound disposed on the second portion of the substrate;
wherein the first selective catalytic reduction compound includes an iron based catalyst; and
wherein the second selective catalytic reduction compound includes a non-iron based catalyst.

2. The catalytic device set forth in claim 1 wherein the first selective catalytic reduction compound includes an iron zeolite (Fe-Zeolite) compound.

3. The catalytic device set forth in claim 2 wherein the second selective catalytic reduction compound includes a copper based catalyst.

4. The catalytic device set forth in claim 3 wherein the second catalytic reduction compound includes a copper SAPO-34 compound.

5. The catalytic device set forth in claim 4 wherein the copper SAPO-34 compound includes a catalyst density of less than 2.74 mg copper per cubic centimeter of copper SAPO-34 compound.

6. The catalytic device set forth in claim 5 wherein the catalyst density is greater than 15 mg copper per cubic inch of copper SAPO-34 compound.

7. The catalytic device set forth in claim 5 further comprising a compound density of less than 110 g washcoat loading per liter of volume of the second portion of the substrate.

8. The catalytic device set forth in claim 7 wherein the compound density is greater than 55 g washcoat loading per liter volume of the second portion of the substrate.

9. The catalytic device set forth in claim 1 further comprising an ammonia (NH3) storage capacity between 0.8 g and 1.2 g of ammonia per liter of volume of the substrate at two hundred degrees Celsius (200° C.).

10. The catalytic device set forth in claim 9 wherein the ammonia storage capacity decreases at a rate of less than 4 mg per each 1° C. increase in temperature.

11. A selective catalytic reduction device for an exhaust gas treatment system of a vehicle, the selective catalytic reduction device comprising:
a canister defining an interior, and having an inlet and an outlet, wherein the canister is configured to receive a flow of exhaust gas through the inlet, and discharge the flow of exhaust gas through the outlet;
a substrate supported by the canister and disposed within the interior of the canister, wherein the substrate includes a porous flow through structure that is operable to allow the flow of exhaust gas to flow through the interior of the canister, from the inlet to the outlet;
wherein the substrate includes a first portion, and a second portion disposed downstream of the first portion;
wherein the first portion of the substrate defines a first volume, the second portion of the substrate defines a second volume, and the sum of the first volume and the second volume equals a total volume of the substrate, with the first volume defining between 15% and 25% of the total volume of the substrate, and with the second volume defining between 75% and 85% of the total volume of the substrate;
a first selective catalytic reduction compound disposed on the first portion of the substrate;
a second selective catalytic reduction compound disposed on the second portion of the substrate;
wherein the first selective catalytic reduction compound includes an iron zeolite (Fe-Zeolite) compound; and
wherein the second selective catalytic reduction compound includes a copper SAPO-34 compound.

12. The selective catalytic reduction device set forth in claim 11 wherein the copper SAPO-34 compound includes a catalyst density of less than 2.74 mg copper per cubic centimeter of copper SAPO-34 compound.

13. The selective catalytic reduction device set forth in claim 12 wherein the catalyst density is greater than 15 mg copper per cubic inch of copper SAPO-34 compound.

14. The selective catalytic reduction device set forth in claim 12 further comprising a compound density of less than 110 g washcoat loading per liter of the second volume of the second portion of the substrate.

15. The selective catalytic reduction device set forth in claim 14 wherein the compound density is greater than 55 g washcoat loading per liter of the second volume of the second portion of the substrate.

16. The selective catalytic reduction device set forth in claim 14 further comprising an ammonia ($NH_3$) storage capacity between 0.8 g and 1.2 g of ammonia per liter of volume of the substrate at two hundred degrees Celsius (200° C.).

17. The selective catalytic reduction device set forth in claim 16 wherein the ammonia storage capacity decreases at a rate of less than 4 mg per each 1° C. increase in temperature.

* * * * *